United States Patent
Hooks

(10) Patent No.: US 8,370,741 B2
(45) Date of Patent: Feb. 5, 2013

(54) HYBRID INTERACTIVE ELECTRONIC TECHNICAL MANUAL

(75) Inventor: Dean C. Hooks, Kirkwood, MO (US)

(73) Assignee: The Boeing Company, Chicago, IL (US)

( * ) Notice: Subject to any disclaimer, the term of this patent is extended or adjusted under 35 U.S.C. 154(b) by 887 days.

(21) Appl. No.: 12/197,876

(22) Filed: Aug. 25, 2008

(65) Prior Publication Data

US 2010/0050065 A1 Feb. 25, 2010

(51) Int. Cl.
*G06F 17/00* (2006.01)

(52) U.S. Cl. ...................................... 715/277

(58) Field of Classification Search ............. 715/277
See application file for complete search history.

(56) References Cited

U.S. PATENT DOCUMENTS

| | | |
|---|---|---|
| 5,805,171 A | 9/1998 | St. Clair et al. |
| 2005/0216429 A1 | 9/2005 | Hertz et al. |
| 2005/0240555 A1 | 10/2005 | Wilde et al. |
| 2006/0149770 A1* | 7/2006 | Jang et al. ............ 707/101 |
| 2008/0120282 A1 | 5/2008 | Liberty et al. |

OTHER PUBLICATIONS

Department of defense, "Military Standard: DOD Requirements for a Logistics Support Analysis Record", (Mar. 28, 1991), pp. 1-30. Full Document available at: http://www.raytheoneagle.com/asent/downloads/MIL-STD-1388-2B%20Notice%201.pdf.*

* cited by examiner

*Primary Examiner* — Doug Hutton, Jr.
*Assistant Examiner* — Shawn S Joseph
(74) *Attorney, Agent, or Firm* — Yee & Associates, P.C.

(57) ABSTRACT

A method, apparatus, and computer program product of developing a hybrid interactive electronic technical manual. A set of sub-elements associated with core maintenance tasks is selected from a plurality of sub-elements in technical data for a device to form a set of core sub-elements. A cost-benefit analysis is performed on each sub-element in the set of remaining sub-elements to identify a sub-element benefit rating for the each sub-element. Sub-elements in the set of remaining sub-elements having a sub-element rating greater than or equal to a threshold benefit rating are selected to form a set of high benefit sub-elements. The set of core sub-elements and the set of high benefit sub-elements are converted from the non-interactive native file format to an interactive electronic technical manual database format. A set of links to the set of unconverted sub-elements is generated to form the hybrid interactive electronic technical manual.

15 Claims, 5 Drawing Sheets

FIG. 5
- 502 FAULT ISOLATION TASK
- 504 FLIGHT CRITICAL SYSTEM (SAFETY) TASK
- 506 TASK COMPLEXITY
- 508 ERROR PRONE TASK
- 510 COMPONENT COSTS ASSOCIATED WITH TASK
- 512 TIME REQUIRED
- 514 MAINTAINER CURRENCY REQUIRED
- 516 CONTAINS SCHEMATICS
- 518 DATA USED BY TRAINING COMMUNITY OR IDENTIFIED AS A SYSTEM TRAINING TASK TASK REQUIREMENT
- 520 FREQUENCY OF MAINTENANCE ACTION
- 522 CONFIGURED FILTERED
- 524 R&M CONSIDERATIONS

PRIORITIZE HYBRID IETM TASK CONSIDERATIONS (SCHEMATICS, WIRING DIAGRAMS, STRUCTURES, WIRING CONNECTOR REPAIR, etc.)

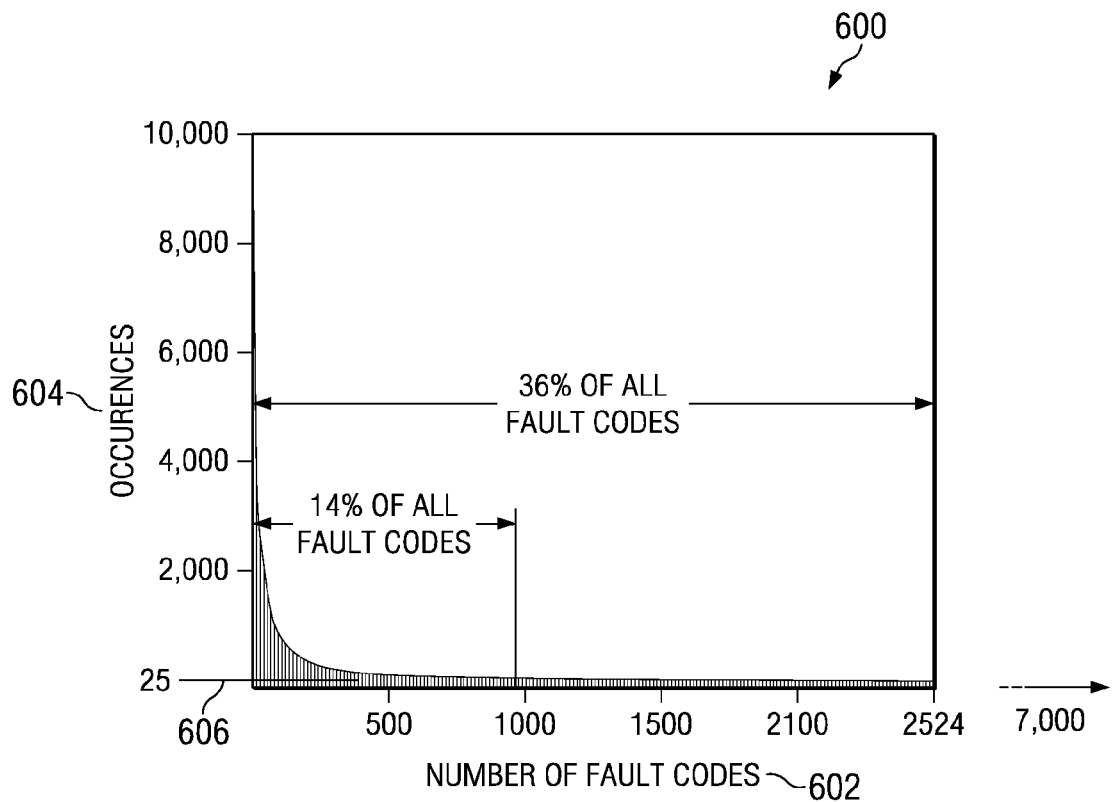

FIG. 6

HYBRID INTERACTIVE ELECTRONIC TECHNICAL MANUAL

BACKGROUND INFORMATION

1. Field

The present disclosure relates generally to an improved data processing system, and in particular, to maintenance tools. Still more particularly, the present disclosure relates to a method and apparatus for developing hybrid interactive electronic technical manuals and data.

2. Background

An interactive electronic technical manual (IETM) is an interactive electronic resource containing technical information, such as, but not limited to, maintenance data, operational procedures, self-test data, calibration information, technical schematics, diagrams, and illustrated parts breakdowns. IETMs typically have data organized in an electronic format that may permit the user to perform text searches, follow links to more detailed and related information, view animated schematics and graphics illustrating circuit flows, hydraulic and mechanical part movements, and other processes. IETMs provide well-documented benefits over traditional static, non-interactive, technical data methodologies, such as paper-based technical manuals and non-interactive native format electronic page-based manuals.

However, converting from traditional page-based technical manual data to IETMs frequently results in high costs. In some cases, the potential high costs of creation and maintenance of IETMs may be cost-prohibitive. Thus, it would be advantageous to have a method and apparatus that overcomes the problems of the costs associated with creation of IETMs.

SUMMARY

An embodiment of the present disclosure provides a method, apparatus, and computer program product of developing a hybrid IETM. A plurality of sub-elements in technical data for a device is identified. The technical data is associated with a non-interactive native file format. A sub-element comprises a portion of technical data associated with a maintenance task for the device. A set of sub-elements associated with core maintenance tasks is selected from the plurality of sub-elements to form a set of core sub-elements. A core sub-element comprises a portion of technical data associated with a basic functionality or basic infrastructure for the hybrid IETM. Sub-elements remaining in the plurality of sub-elements are identified to form a set of remaining sub-elements.

A cost-benefit analysis is performed on each sub-element in the set of remaining sub-elements using relevant maintenance history data for the device to identify a sub-element benefit rating for the each sub-element in the set of remaining sub-elements. Sub-elements in the set of remaining sub-elements having a sub-element rating greater than or equal to a threshold benefit rating are selected to form a set of high benefit sub-elements. Sub-elements in the set of remaining sub-elements having a sub-element rating below the threshold benefit rating form a set of unconverted sub-elements. The set of core sub-elements and the set of high benefit sub-elements are converted from the non-interactive native file format to an IETM database format. A set of links to the set of unconverted sub-elements is generated to form the hybrid IETM. Each link in the set of links is a link to a subset of unconverted sub-elements in the technical data in the non-interactive native file format.

In another advantageous embodiment, an apparatus comprising a bus system; a communications system coupled to the bus system; a memory connected to the bus system, wherein the memory includes computer usable program code; and a processing unit coupled to the bus system is provided. The processing unit executes the computer usable program code to identify a plurality of sub-elements in technical data for a device, select a set of sub-elements associated with core maintenance tasks from the plurality of sub-elements to form a set of core sub-elements; identify sub-elements remaining in the plurality of sub-elements to form a set of remaining sub-elements; perform a cost-benefit analysis on each sub-element in the set of remaining sub-elements using relevant maintenance history data for the device to identify a sub-element benefit rating for the each sub-element in the set of remaining sub-elements; and select sub-elements in the set of remaining sub-elements having a sub-element rating greater than or equal to a threshold benefit rating to form a set of high benefit sub-elements. Sub-elements in the set of remaining sub-elements having a sub-element rating below the threshold benefit rating form a set of unconverted sub-elements. The processing unit executes the computer usable program code to convert the set of core sub-elements and the set of high benefit sub-elements from the non-interactive native file format to an IETM database format and generate a set of links to the set of unconverted sub-elements to form the hybrid IETM.

Yet another advantageous embodiment provides a computer program product for developing a hybrid IETM. The computer program product comprises a computer usable medium having computer usable program code embodied therewith. The computer usable program code comprises computer usable program code configured to identify a plurality of sub-elements in technical data for a device. A sub-element comprises a portion of technical data associated with a maintenance task for the device. The technical data is associated with a non-interactive native file format. The computer usable program code comprises computer usable program code configured to select a set of sub-elements associated with core maintenance tasks from the plurality of sub-elements to form a set of core sub-elements. A core sub-element comprises a portion of technical data associated with a basic functionality or basic infrastructure for a hybrid IETM. The computer usable program code is configured to identify sub-elements remaining in the plurality of sub-elements to form a set of remaining sub-elements. The computer usable program code also comprises computer usable program code configured to perform a cost-benefit analysis on each sub-element in the set of remaining sub-elements using maintenance history data for the device to identify a sub-element benefit rating for the each sub-element in the set of remaining sub-elements. The computer usable program code is configured to select sub-elements in the set of remaining sub-elements having a sub-element rating greater than or equal to a threshold benefit rating to form a set of high benefit sub-elements is also provided. Sub-elements in the set of remaining sub-elements having a sub-element rating below the threshold benefit rating form a set of unconverted sub-elements. The computer usable program code is also configured to convert the set of core sub-elements and the set of high benefit sub-elements from the non-interactive native file format to an IETM database format and generate a set of links to the set of unconverted sub-elements to form the hybrid IETM. Each link in the set of links is a link to a subset of unconverted sub-elements in the technical data in the non-interactive native file format.

In still another advantageous embodiment, a data processing system comprising a data storage device and a hybrid IETM manager is provided. The data storage device stores technical data for a device in a non-interactive native file format and relevant maintenance history data for the device.

The hybrid IETM manager identifies a plurality of sub-elements in technical data for the device and receives a selection of a set of sub-elements associated with core maintenance tasks from the plurality of sub-elements to form a set of core sub-elements. The unselected sub-elements in the plurality of sub-elements form a set of remaining sub-elements. A core sub-element comprises a portion of technical data associated with a basic functionality or basic infrastructure for a hybrid IETM. The hybrid IETM manager comprises a cost/benefit analysis engine. The cost/benefit analysis engine performs a cost/benefit analysis on each sub-element in the set of remaining sub-elements using the maintenance history data for the device to identify a sub-element benefit rating for the each sub-element in the set of remaining sub-elements. The hybrid IETM manager selects sub-elements in the set of remaining sub-elements having a sub-element rating greater than or equal to a threshold benefit rating to form a set of high benefit sub-elements. The sub-elements in the set of remaining sub-elements having a sub-element rating below the threshold benefit rating form a set of unconverted sub-elements. The hybrid IETM manager converts the set of core sub-elements and the set of high benefit sub-elements from the non-interactive native file format to an IETM database format and generate a set of links to the set of unconverted sub-elements to form the hybrid IETM, wherein each link in the set of links is a link to a subset of unconverted sub-elements in the technical data in the non-interactive native file format.

The hybrid IETM provides most of the benefits of interactive technical manuals for minimal cost. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 5 is a block diagram illustrating task considerations for identifying capabilities for inclusion in the database portion of a hybrid IETM in accordance with an advantageous embodiment;

FIG. 6 is a graph illustrating frequencies of fault code occurrences in a fleet in accordance with an advantageous embodiment;

DETAILED DESCRIPTION

Figure 1:
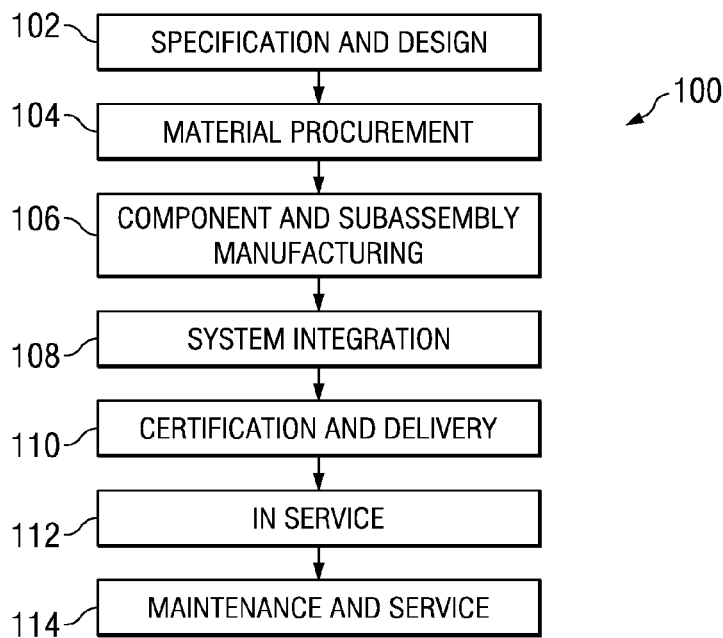
FIG. 1 is a diagram illustrating an aircraft manufacturing and service method in accordance with an advantageous embodiment.

Referring now to FIG. 1, a diagram illustrating an aircraft manufacturing and service method is depicted in accordance with an advantageous embodiment. During pre-production, exemplary aircraft manufacturing and service method 100 may include specification and design 102 of an aircraft and material procurement 104. During production, component and subassembly manufacturing 106 and system integration 108 of the aircraft takes place. Thereafter, the aircraft may go through certification and delivery 110 in order to be placed in service 112. While in service by a customer, the aircraft is scheduled for routine maintenance and service 114, which may include modification, reconfiguration, refurbishment, and other maintenance or service, as well as unscheduled maintenance and service.

A hybrid IETM, in accordance with an advantageous embodiment, may be used during each of the processes of aircraft manufacturing and service method 100. Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

In FIG. 1, the hybrid IETM is used during aircraft manufacturing repair, maintenance, and service processes. However, the hybrid IETM may be used during the manufacturing and/or service of any machine or vehicle, including, without limitation, an aerospace vehicle, an automobile, a truck, a ship, a boat, a submarine, construction equipment, a machining or fabrication tool, manufacturing equipment, or any other type of machine or vessel that may require utilization of a technical manual and/or schematics for maintenance and/or repairs of the device.

Figure 2:
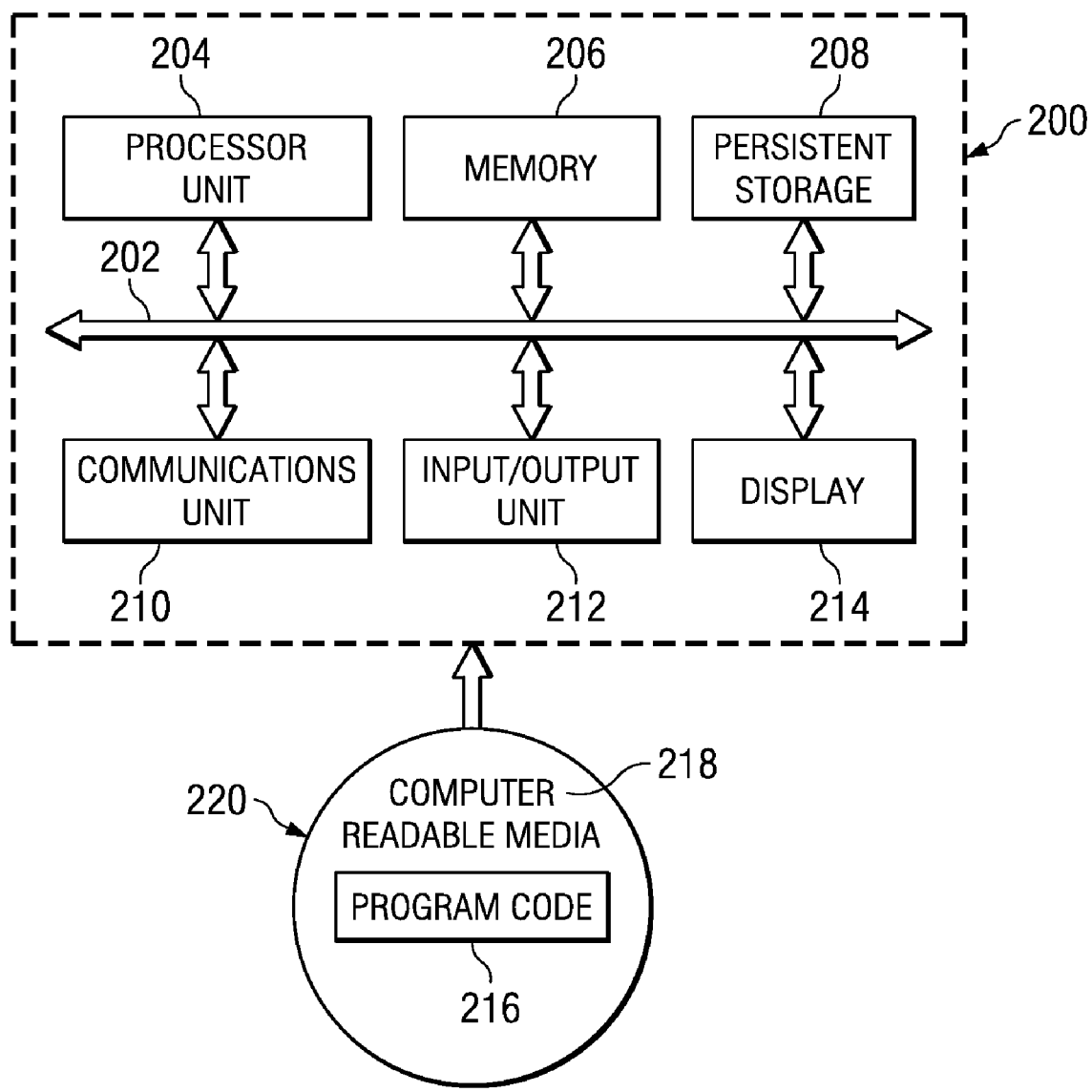
FIG. 2 is a diagram illustrating a data processing system in accordance with an advantageous embodiment.

Turning now to FIG. 2, a diagram of a data processing system is depicted in accordance with an illustrative embodiment. Data processing system 200 is an example of a data processing system that may be used to create, implement, manage, and update a hybrid IETM.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Typically, when a user wants to create an IETM for an aircraft, a full IETM conversion is performed. This full conversion involves converting all the schematics, parts information, and other technical data for a device into a complete IETM. In other words, all technical information in a non-interactive native file format are converted to electronic data in an IETM database format. A non-interactive native format may include, without limitation, scanned paper documents, portable file format (PDF) documents, standard generalized markup language (SGML) documents, or documents in any other non-interactive electronic format.

The embodiments recognize that this full conversion process may be prohibitively expensive for a user. In such cases, the user may be forced to continue using paper based manuals or non-interactive native format page based electronic technical manuals that do not provide any interactive functionality or dynamic content. Moreover, the illustrative embodiments recognize that traditional IETMs require significant initial investment prior to realizing the benefits of the IETM.

Therefore, one advantageous embodiment provides a method, apparatus, and computer program product for developing a hybrid IETM. A hybrid IETM is an IETM that does not contain all of the technical data for the device. Instead, the hybrid IETM only includes selected portions of the technical data that provides the maximum benefit relative to the costs of converting the technical data into an IETM database format.

In one embodiment, technical data for a device is retrieved. The technical data is associated with a non-interactive native file format, such a portable file format (PDF). The device may be an aircraft, heavy machinery, a vehicle, an airplane, an aerospace vehicle, a construction vehicle, an automobile, a truck, a ship, a boat, a submarine, a data processing system, a machining/fabrication tool, a robot, or any other type of machine, vessel, or device, that may require utilization of a technical manual and/or schematics for manufacture, maintenance, repair, and/or upgrading.

A plurality of sub-elements in the technical data is identified. A sub-element comprises a portion of technical data associated with a maintenance task for the device. A maintenance task may be a manufacturing task, an assembly task, a repair task, a component replacement task, or any other type of assembly, repair, or maintenance task.

A set of sub-elements associated with core maintenance tasks is selected from the plurality of sub-elements to form a set of core sub-elements. A core sub-element comprises a portion of technical data associated with a basic functionality or basic infrastructure for the hybrid IETM. For example, the basic functionality and basic infrastructure of an automobile may include an engine, wheels, a steering device, an accelerator, and a brake. These are the sub-elements that are essential to create a car. Other features, such as air conditioning, radio, lights, interior upholstery, and other elements may be highly beneficial or nice to have on the automobile, but these non-core elements are not required. Likewise, the core sub-elements of a hybrid IETM comprises the sub-elements that are essential or necessary to the IETM. These core sub-elements may include, without limitation, removal and installation procedures and test procedures.

As used herein, the term "set" may refer to a single item, as well as two or more items. For example, the set of sub-elements may include a single sub-element, as well as two or more sub-elements. Sub-elements remaining in the plurality of sub-elements are identified to form a set of remaining sub-elements.

A cost-benefit analysis is performed on each sub-element in the set of remaining sub-elements using maintenance history data for the device to identify a sub-element benefit rating for the each sub-element in the set of remaining sub-elements. In one embodiment, the maintenance history data comprises in-service maintenance data as well as scheduled maintenance data from a plurality of operators of devices of a given type or model.

Sub-elements in the set of remaining sub-elements having a sub-element rating greater than or equal to a threshold benefit rating are selected to form a set of high benefit sub-elements. Sub-elements in the set of remaining sub-elements having a sub-element rating below the threshold benefit rating form a set of unconverted sub-elements. The set of core sub-elements and the set of high benefit sub-elements are converted from the non-interactive native file format to an IETM database format. A set of links to the set of unconverted sub-elements is generated to form the hybrid IETM. Each link in the set of links is a link to a subset of unconverted sub-elements in the technical data in the non-interactive native file format.

The advantageous embodiments in FIGS. 3-8 are described as hybrid IETM for aircraft. However, the hybrid IETM and the process for creating and maintaining the hybrid IETM may be used for any type of device and is not limited to aircraft.

Figure 3:
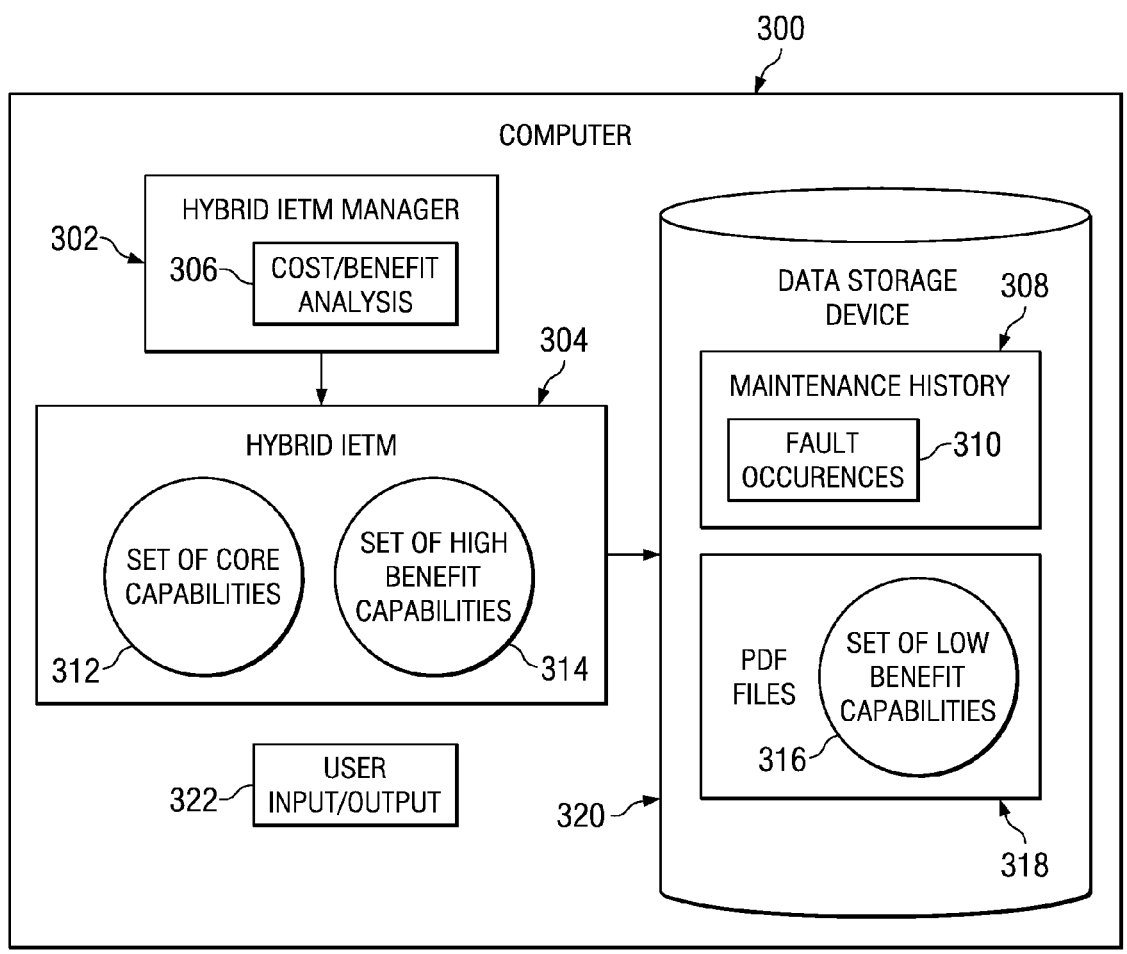
FIG. 3 is a diagram illustrating a hybrid IETM manager in accordance with an advantageous embodiment.

FIG. 3 is a diagram illustrating a hybrid IETM manager in accordance with an advantageous embodiment. Computer 300 may be implemented using any type of computing device, such as a personal computer, laptop, personal digital assistant, or any other computing device depicted in FIG. 2.

Hybrid IETM manager 302 is a software IETM development and IETM maintenance tool that selects and converts only selected portions of the technical data for an aircraft that meets certain cost/benefit criteria to form hybrid IETM 304. The selected portions of the technical data to be converted into the hybrid IETM may be selected entirely by the software hybrid IETM manager 302, selected by a human user, or selected partially by the hybrid IETM manager 302 and partially by a human user. Likewise, the conversion of the selected portions of the technical data from the non-interactive native format into the IETM database format may be performed in whole by hybrid IETM manager 302 without human intervention, entirely by a human user using a conversion tool, or partially by hybrid IETM manager 302 and partially by a human user.

Hybrid IETM 304 is a database of interactive electronic technical data for a device, such as, without limitation, an aircraft, automotive vehicle, ship, helicopter, or any other device. Hybrid IETM 304 may include, without limitation, circuit diagrams, animated circuit diagrams, schematics, animated schematics, part information, data on maintenance and part replacement, wiring diagrams, structure diagrams, wiring connector repair, and/or any other technical data that may be included in a traditional IETM.

However, unlike a traditional IETM, hybrid IETM 304 only includes sub-elements of the technical data associated with core capabilities and high benefit capabilities. A sub-element comprises portions of the technical data associated with a task. The rest of the sub-elements of the technical data that is not associated with core capabilities or high benefit capabilities are linked to the hybrid IETM database in a native electronic document format that is not converted into the database format for hybrid IETM 304.

Cost/benefit analysis 306 is a software component for performing data mining and cost/benefit analysis on capabilities available for inclusion in the database portion of hybrid IETM 304. Capabilities that provide a high benefit relative to the costs of including the capabilities are included in hybrid IETM 304. The capabilities that provide a low benefit to the user given the costs of including and maintaining those capabilities are not included in hybrid IETM 304.

In other words, cost/benefit analysis 306 identifies sub-elements that provide a high benefit relative to costs, such as, without limitation, sub-elements of the technical data associated with highly used portions of the manual, frequently performed tasks, complex tasks associated with a plurality of steps or complex procedures, difficult or high error prone tasks, expensive parts, as well as other criteria.

The hybrid IETM 304 may also involve language conversion. For example, a technical manual written in English may be converted into hybrid IETM 304 in a different language, such as, without limitation, Japanese or Spanish. In such cases, cost/benefit analysis 306 may be used to identify the most beneficial portions of the technical manual to translate while portions of the technical manual that are rarely used or less cost-effective to translate remain in the native format in the original language.

In another embodiment, cost/benefit analysis 306 may be used to identify a prioritization for performing a full conversion of a technical manual into an IETM using a phased approach. In such a case, cost/benefit analysis 306 identifies core capabilities and high benefit capabilities for conversion during a first phase to create hybrid IETM 304. When the first phase is complete, the hybrid interactive technical manual containing the core and high benefit capabilities is available for immediate use by the client. During a second phase, cost/benefit analysis 306 is used to identify moderately beneficial capabilities for conversion into hybrid IETM 306 during a second phase. When the second phase is complete, the updated hybrid IETM is again made available to the user for utilization. In this manner, the user does not have to wait until the entire interactive technical manual is complete. Finally, low benefit capabilities may be converted during a third phase to create the completed IETM.

The embodiments are not limited to performing a phased conversion in three phases. A hybrid IETM may be developed and updated over two phases, four phases, or any other number of phases spanning any given time intervals until the complete conversion has taken place and a full IETM is ready for utilization. Thus, a user is able to receive the benefits of having the core capabilities and high benefit capabilities available for utilization in the form of hybrid IETM 304 prior to completion of the full IETM. This embodiment also permits a user to spread out the costs of developing the full IETM over a plurality of phases.

In this embodiment, Hybrid IETM manager 302 breaks down the technical data in a non-interactive native format into rational sub-elements. Cost/benefit analysis 306 then performs a cost/benefit analysis for each sub-element. The cost for each sub-element may be estimated by traditional means. The benefit of each sub-element may be analyzed based on usage data history, various measures of maintenance effectiveness, error rate associated with the user of this sub-element, fault occurrences 310, and other information available in maintenance history 308 for the apparatus, such as an aircraft of a same model and/or similar aircraft of a different model.

Fault occurrences 310 is a record of the frequency with which each fault code occurs over a given period of time for the type of apparatus or similar apparatus. For example, if the given aircraft is a particular model of aircraft, fault occurrences 310 identifies the number of times each fault code has been recorded as occurring in the particular model of apparatus over a given period of time. Maintenance history 308 may include maintenance information for similar or related aircrafts if maintenance history does not include sufficient maintenance information for the given aircraft.

Hybrid IETM 304 comprises set of core capabilities 312, the selected set of high benefit capabilities 314, and links to the unconverted set of low benefit capabilities in the non-interactive native format. Set of core capabilities 312 is a set of sub-elements of the technical data for the given aircraft that provide core capabilities of IETM, such as basic functionality and infrastructure of the IETM. The core capabilities may include, without limitation, part removal procedures, part installation procedures, test procedures, and any other procedures and interactive technical data capabilities that provide the greatest benefit and utility to users. Set of core capabilities 312 may be a set of one capability, or a set of two or more capabilities.

Set of high benefit capabilities 314 is a set of sub-elements of the technical data for the given aircraft that provide high benefits relative to the cost of developing and maintaining those capabilities in hybrid IETM 304. In other words, set of high benefit capabilities 314 comprises technical data that has the greatest benefit if converted to an IETM. High benefit capabilities may include, without limitation, schematics, wiring diagrams, structures, wiring connector repair, and other technical data and capabilities associated with frequently occurring fault codes. Set of high benefit capabilities 314 may be a null set having no capabilities, a set of one capability, or a set of two or more capabilities.

Set of low benefit capabilities 316 is a set of capabilities that would provide only low benefits relative to the cost of implementing those capabilities in hybrid IETM 304. Therefore, the technical data sub-elements in set of low benefit capabilities 316 are not included in hybrid IETM 304. Instead, the technical data sub-elements in set of low benefit capabilities 316 are included in a non-interactive native form. Set of low benefit capabilities 310 is maintained in a native format and linked to hybrid IETM 304. A user utilizing hybrid IETM 304 may follow a link to view the technical data content included in set of low benefit capabilities 316.

In one embodiment, cost/benefit analysis 306 receives maintenance history 308 for the aircraft. Hybrid IETM 304 uses data mining of maintenance history 308 and other system maintenance information to identify the core database-driven tasks of the hybrid IETM versus the low benefit information that may not be included in the hybrid IETM. In other words, in this example, hybrid IETM 304 includes a set of links to the low benefit information in the non-interactive native format but does not include the low benefit information converted into a hybrid IETM database format.

Cost/benefit analysis 306 performs a cost-benefit analysis on each sub-element to identify a sub-element benefit rating for each sub-element in the set of remaining sub-elements. Cost/benefit analysis 306 identifies sub-elements having a sub-element rating exceeding a threshold benefit rating to form set of high benefit capabilities 314. Hybrid IETM manager 302 converts the set of high benefit sub-elements to the IETM database format and adds the set of high benefit sub-elements in the IETM database to the hybrid IETM database. Cost/benefit analysis 306 identifies sub-elements in remaining sub-elements having a sub-element rating below the threshold benefit rating to form set of low benefit capabilities 316.

Thus, hybrid IETM manager 302 links IETM database-driven portions of the design with scrolling static data pages in the non-interactive native format, such as portable document format and displays. The technical data sub-elements in set of low benefit capabilities in data storage device 320 are linked to hybrid IETM 304. In another embodiment, during a phased conversion of the technical data, the set of low benefit capabilities are linked to the initial version of the hybrid interactive technical manual created during an early phase of the conversion. During a later phase, one or more capabilities in the set of low benefit capabilities may be converted to the IETM database format in an updated version of the hybrid IETM created during the later phase of the conversion process.

Data storage device 320 is a device for storing data. Data storage may be implemented as a hard drive, a flash memory, a main memory, read only memory (ROM), a random access memory (RAM), a compact disc (CD), a compact disc rewritable (CD-RW), or any other type of data storage device. Data storage may be implemented in a single data storage device or a plurality of data storage devices.

The user may access and utilize the features and functionality of hybrid IETM 304 using user input/output. A user may also optionally manually select one or more capabilities for inclusion in the database portion of hybrid IETM 304 using user input/output 322 during development of hybrid IETM 304. User input/output 322 may be implemented in any type of user interface for receiving user input and providing output to the user, such as, without limitation, a graphical user interface, a command line interface, a menu driven interface, a keyboard, a mouse, a liquid crystal display (LCD), a plasma screen, a cathode ray tube (CRT) display screen, a touch screen, a voice-recognition system, or any other type of input/output device.

Figure 4:
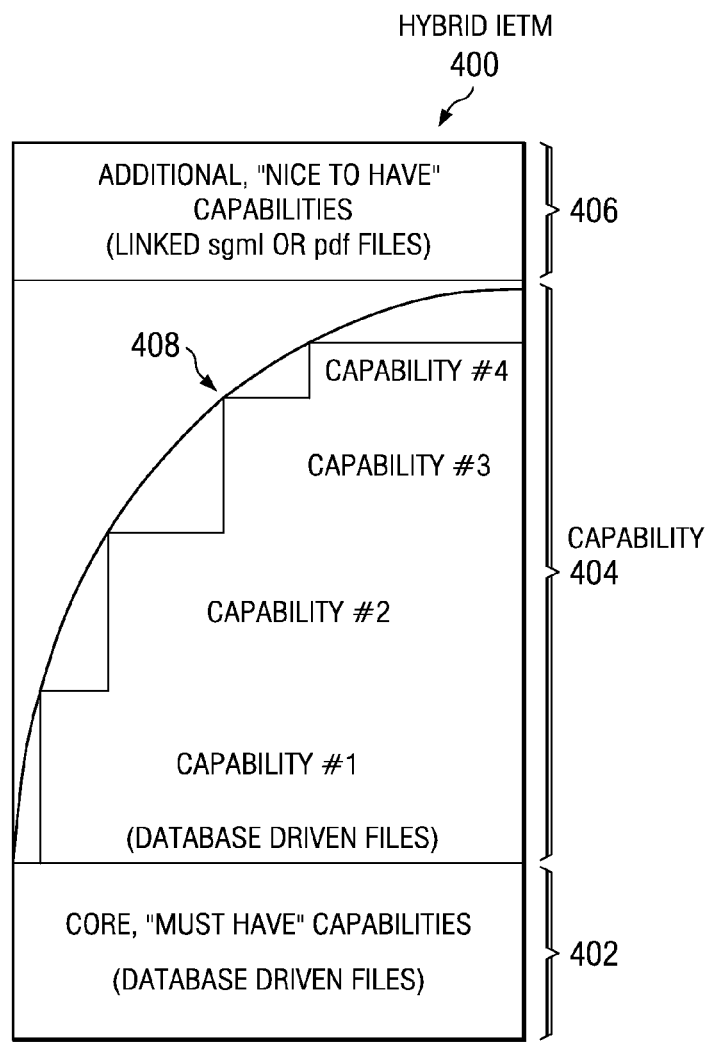
FIG. 4 is a block diagram illustrating capabilities that are available for inclusion in the database portion of a hybrid IETM in accordance with an advantageous embodiment.

Turning now to FIG. 4, a block diagram illustrating capabilities that are available for inclusion in the database portion of a hybrid IETM is shown in accordance with an advantageous embodiment. Hybrid IETM 400 is a hybrid IETM that only includes core capabilities and high benefit capabilities, such as hybrid IETM 304 in FIG. 3. In this example, sub-elements of technical data that are identified as low benefit capabilities are not included in hybrid IETM 400. Instead, hybrid IETM 400 includes links to the low benefit technical data sub-elements, which are maintained in a native, non-interactive electronic format.

Core capabilities 402 are capabilities that form the core, basic, or essential tasks associated with maintenance and repair of the given aircraft, such as capabilities in set of core capabilities 312 in FIG. 3. Core capabilities may be referred to as "must have" capabilities. A maintenance or repair task that should always be completed timely and accurately may be a core capability. Core capabilities may also include tasks associated with safety, flight readiness, critical systems, and tasks associated with risks to technicians and maintenance personnel. Core capabilities are incorporated initially into a first version of a hybrid IETM.

High benefit capabilities 404 is technical data in sub-elements for tasks that are identified as providing a high benefit for inclusion in the database portion of the hybrid IETM, such as set of high benefit capabilities 314 in FIG. 3.

Additional capabilities 406 include technical data of sub-elements for tasks that are identified as low benefit relative to the cost of including the tasks in the hybrid IETM, such as set of low benefit capabilities 316 in FIG. 3. Sections of lesser importance and/or technical data that are used infrequently may be identified as low benefit capabilities 406. These low benefit capabilities 406 are provided as links to PDF or SGML files similar to the data presentations within standard low-cost type I electronic technical manuals (ETMs). For example, the descriptive data in the general series (GS) books or the theory of operation section in the manual.

Line 408 shows diminishing returns as the benefits of adding a capability begins to approach the costs of including the capability in the hybrid IETM. In such a case, high benefit tasks associated with greater benefits, such as "capability 1" and "capability 2" may be included in the initial hybrid IETM. In this example, but without limitation, "capability 1" may be a fault isolation capability and "capability 2" may be a flight critical capability.

Other capabilities, such as "capability 3" and "capability 4," which have a lower benefit may be added to the hybrid IETM at a later time in a phased conversion process, as additional funding becomes available. In this example, but without limitation, "capability 3" may be other systems information and "capability 4" may be other descriptive information.

In this manner, the hybrid IETM manager and/or user can prioritize which capabilities to include in the initial hybrid IETM and the order in which additional capabilities are added to the hybrid IETM as funding becomes available to expand the hybrid IETM.

FIG. 5 is a block diagram illustrating task considerations for identifying capabilities for inclusion in the database portion of a hybrid IETM in accordance with an advantageous embodiment. Hybrid IETM task considerations are factors or criteria that a hybrid IETM manager and/or a user may consider when identifying high benefit capabilities and selecting sub-elements of the technical data that meet cost/benefit criteria for inclusion in the database portion of a hybrid IETM. The task consideration may include, without limitation, fault isolation task 502, flight critical system and safety task 504, task complexity 506, whether the task is an error prone task 508, component costs associated with task 510, time required 512, maintainer currency required 514, contains schematics 516, data used by training community or identified as a system training task requirement 518, frequency of maintenance action 520, configured filtered 522, and reliability and maintainability (R&M) considerations 524.

For example, if a task has a high frequency of maintenance action 520 the task may have a higher benefit for inclusion in the database portion of the hybrid IETM than a task that has a low frequency of maintenance action and thus, a more infrequent utilization and lesser need for the technical data for the task. However, if the task is a complex task, as may be indicated by time required 512 and/or task complexity 506, the task may have a higher benefit even if the task has a low frequency of maintenance action. In such a case, the fact that the task is complex, time consuming, and performed infrequently, may indicate that technicians and maintenance personnel may have a greater need for the sub-elements in the technical data associated with the task to be included in the hybrid IETM. Tasks that are simpler, quicker to complete, and performed regularly may be so routine that the benefits of including such technical data in the IETM may be less than the benefits of including the more complex and infrequently performed task.

In another example, tasks that are error prone tasks 508 have a higher benefit than tasks with a lower rate of error. Likewise, if component costs associated with task 510 are higher, then it may be more cost effective to include the task in the hybrid IETM to avoid damaging the higher cost components. In addition, a particular task may be associated with "collateral" damage to other components. In such a case, even if the task does not involve high component costs for the task, the task may frequently result in damage to other high cost components as collateral damage. Tasks associated with lower cost components that may be replaced or repaired easily or negligible collateral damage may provide a lower benefit relative to the costs of converting the sub-elements associated with the task for inclusion in the hybrid IETM database.

FIG. 5 illustrates some of the task categories and task considerations that may be analyzed when identifying high benefit and core capabilities for inclusion in the database portion of a hybrid IETM. However, FIG. 5 is not an exhaustive list of all the task categories, criteria, and task considerations that may be used. The hybrid IETM manager and/or user may analyze other task categories and task consideration in addition to those listed in FIG. 5. For example, and without limitation, the task categories and task considerations may also include considerations such as, whether the task is a configuration unique task, a prevalence of the appearance of a given code, such as a rate at which a given code occurs, a complexity of schematics for the task, a number of steps in the task, a number of systems affected by the task, as well as any other considerations that may influence the determination of cost versus benefits of including the technical data for the task in the hybrid IETM.

Referring now to FIG. 6, a graph illustrating frequencies of fault code occurrences in a fleet is depicted in accordance with an advantageous embodiment. As used herein, a fleet refers to a plurality of devices of the same type or model or devices of similar type or similar model.

Graph 600 is a histogram illustrating the number of fault codes 602 occurring in a given fleet of devices over a given time interval. In this example, the fleet of devices is a fleet of aircraft and the time interval is five years. A fault code is a code that is used for diagnostic and maintenance purposes to indicate a condition of a device or a component of the device. Graph 600 is merely an example of possible fault codes that may occur in a piece of heavy equipment or other device over a given time frame.

In this example, graph 600 shows all occurrences of each fault code in a fleet of aircraft over thousands of flights. A first fault code appeared 8,000 times throughout the fleet during the five year period. A second fault code appeared 7,800 times. The first 1,000 fault codes shown at 602 comprise about 14% of the total number of all possible fault codes. These first 1,000 fault codes occur approximately 25 times or more, as shown at 606. Approximately two-thirds (⅔) of all the possible fault codes occur one or more time. In other words, the majority of the fault codes occur only rarely, sometimes as rarely as a single occurrence or as few as 25 occurrences of a given fault code throughout the entire fleet during the five year period. Thus, graph 600 illustrates that the occurrences of each fault code diminishes as the number of all possible fault codes increases.

Figure 7:
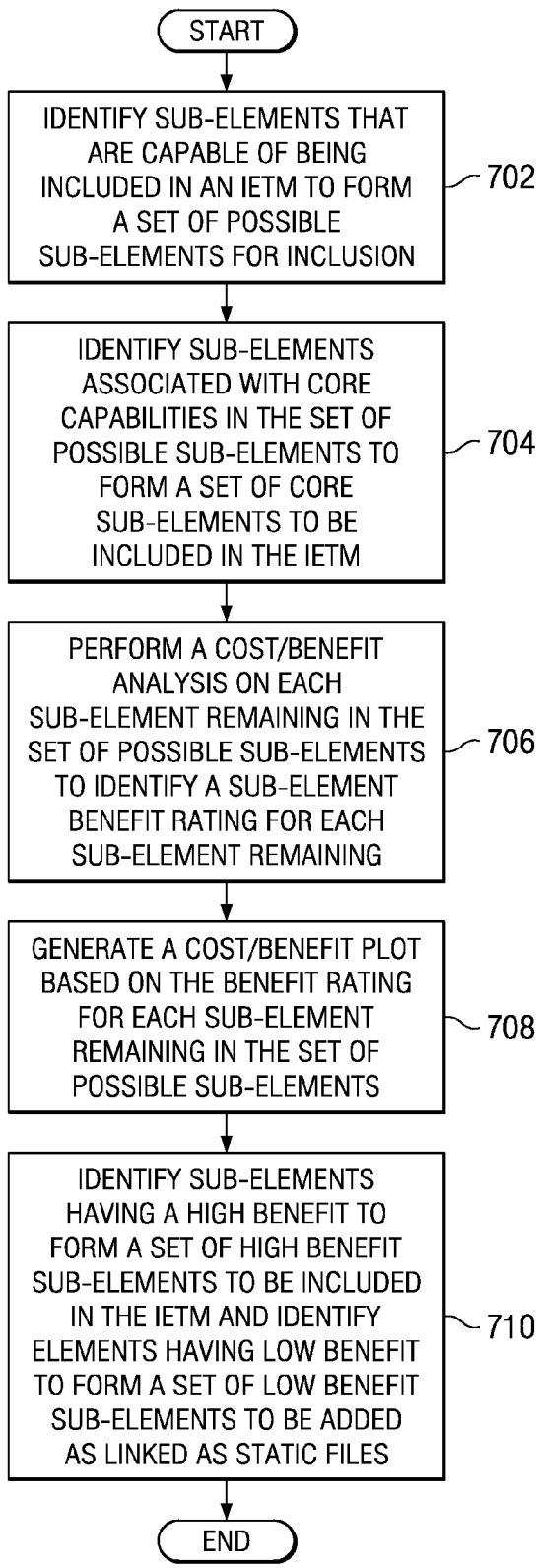
FIG. 7 is a flowchart illustrating a process for identifying capabilities for inclusion in the database portion of a hybrid IETM in accordance with an advantageous embodiment.

Turning now to FIG. 7, a flowchart illustrating a process for identifying capabilities for inclusion in the database portion of a hybrid IETM is shown in accordance with an advantageous embodiment. The process in FIG. 7 may be implemented by software for developing and maintaining a hybrid IETM, such as hybrid IETM manager 302 in FIG. 3. In another embodiment, operations 706-710 may be implemented in whole or in part by a human user.

The process begins by identifying sub-elements of technical data that are capable of being included in an IETM to form a set of possible sub-elements for inclusion (operation 702). The hybrid IETM manager identifies sub-elements associated with core capabilities in the set of possible sub-elements to form a set of core sub-elements to be included in the IETM (operation 704). The hybrid IETM manager performs a cost/benefit analysis on each sub-element remaining in the set of possible sub-elements to identify a sub-element benefit rating for each remaining sub-element (operation 706). The cost/benefit analysis may include analysis of one or more of the task categories and task considerations shown in FIG. 5. Each sub-element remaining in the set of possible sub-elements is those sub-elements that are not included in the set of core-sub-elements. The hybrid IETM manager generates a cost/benefit plot based on the benefit rating for each sub-element remaining in the set of possible sub-elements (operation 708). The hybrid IETM manager then identifies sub-elements having a high benefit to form a set of high benefit sub-elements to be included in the IETM and identifies elements having low benefit to form a set of low benefit sub-elements to be added as linked non-interactive native format files to form a hybrid IETM (operation 710) with the process terminating thereafter.

The hybrid IETM may be accessed and utilized in accordance with any known methods for accessing and utilizing technical data in an IETM.

Figure 8:
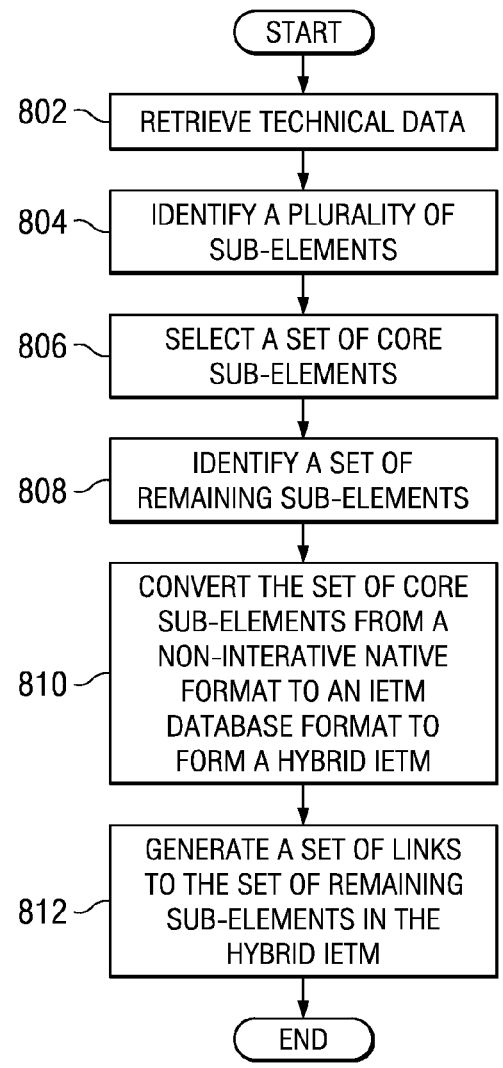
FIG. 8 is a flowchart illustrating a process for developing a hybrid IETM in accordance with an advantageous embodiment.

FIG. 8 is a flowchart illustrating a process for developing a hybrid IETM in accordance with an advantageous embodiment. The process in FIG. 8 may be implemented by software for developing and maintaining a hybrid IETM, such as hybrid IETM manager 302 in FIG. 3. In another embodiment, operations 806-810 may be implemented in whole or in part by a human user.

The process begins by retrieving technical data for a device (operation 802). A plurality of sub-elements is identified in the technical data (operation 804). A set of core sub-elements is identified (operation 806). A set of remaining sub-elements is identified (operation 808). The set of core sub-elements is converted from a non-interactive native format to an IETM database format to form a hybrid IETM (operation 810). A set of links to the set of remaining sub-elements is generated in the hybrid IETM (operation 812) with the process terminating thereafter.

Thus, in one advantageous embodiment, a method, apparatus, and computer program product of developing a hybrid IETM is provided. Technical data for a device is retrieved. The technical data is associated with a non-interactive native file format. A plurality of sub-elements in the technical data is identified. A sub-element comprises a portion of technical data associated with a maintenance task for the device. A set of sub-elements associated with core maintenance tasks is selected from the plurality of sub-elements to form a set of core sub-elements. A core sub-element comprises a portion of technical data associated with a basic functionality or basic infrastructure for the hybrid IETM. Sub-elements remaining in the plurality of sub-elements are identified to form a set of remaining sub-elements.

A cost-benefit analysis is performed on each sub-element in the set of remaining sub-elements using maintenance history data for the device to identify a sub-element benefit rating for the each sub-element in the set of remaining sub-elements. Sub-elements in the set of remaining sub-elements having a sub-element rating greater than or equal to a threshold benefit rating are selected to form a set of high benefit sub-elements. Sub-elements in the set of remaining sub-elements having a sub-element rating below the threshold benefit rating form a set of unconverted sub-elements. The set of core sub-elements and the set of high benefit sub-elements are converted from the non-interactive native file format to an IETM database format. A set of links to the set of unconverted sub-elements is generated to form the hybrid IETM. Each link in the set of links is a link to a subset of unconverted sub-elements in the technical data in the non-interactive native file format.

The hybrid IETM manager uses data mining and cost/benefit analysis to identify the elements of traditional technical data that provide the greatest benefits and value to a user when that data is converted to an IETM. The hybrid IETM reaps the primary benefits of a full IETM while minimizing the cost of conversion by judiciously selecting and converting only portions of the technical data that meet certain cost/benefit criteria. The non-converted portions of the technical data are linked to the hybrid IETM for easy access by a user. The hybrid IETM may be developed for less than the cost of a full IETM while realizing a majority of the benefits of a full IETM. In a phased conversion, the cost of developing a full IETM may be spread out over multiple phases to reduce the initial costs of creating the IETM.

The hybrid IETM provides system users with an option to define and procure a lower cost hybrid IETM, while leveraging the major benefits of a complete IETM. The hybrid IETM provides many of the advantages of a full IETM to users and programs that cannot afford to develop and/or maintain a full IETM. In addition, the savings generated by the hybrid IETM may be leveraged to expand the database portion of the hybrid IETM based on changing user requirements and modifications to the aircraft or other device. In other words, users have the option to add additional capabilities to the hybrid IETM after fielding when additional funding becomes available. Fielding refers to providing a functional hybrid interactive technical manual to a user for utilization. This hybrid phased approach provides most of the benefits of a traditional IETM for a significantly lower initial cost and overall investment.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communication link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of developing a hybrid interactive electronic technical manual, the method comprising:
   identifying a plurality of sub-elements in technical data for a device, wherein a sub-element comprises a portion of technical data associated with a maintenance task for the device, wherein the technical data is associated with a non-interactive native file format;
   selecting a set of sub-elements associated with core maintenance tasks from the plurality of sub-elements to form a set of core sub-elements, wherein a core sub-element comprises a portion of technical data associated with a basic functionality or basic infrastructure for a hybrid interactive electronic technical manual, and the core maintenance tasks including at least one of part removal procedures, part installation procedures, and device test procedures;
   identifying sub-elements remaining in the plurality of sub-elements to form a set of remaining sub-elements;
   retrieving maintenance history information for the device from a plurality of operators to form maintenance history data;
   performing a cost-benefit analysis on the each sub-element in the set of remaining sub-elements using maintenance history data for the device to identify a sub-element benefit rating for the each sub-element in the set of remaining sub-elements, wherein the benefit rating includes at least one of a number of maintenance procedures performed for the sub-element and a number of fault codes generated for the sub-element in the set of remaining sub-elements;
   selecting sub-elements in the set of remaining sub-elements having a sub-element rating greater than or equal to a threshold benefit rating to form a set of high benefit sub-elements, wherein sub-elements in the set of remaining sub-elements having a sub-element rating below the threshold benefit rating form a set of unconverted sub-elements; and
   converting the set of core sub-elements and the set of high benefit sub-elements from the non-interactive native file format to an interactive electronic technical manual database format and generating a set of links to the set of unconverted sub-elements to form the hybrid interactive electronic technical manual, wherein each link in the set of links is a link to a subset of unconverted sub-elements in the technical data in the non-interactive native file format.

2. The method of claim 1 wherein the set of core sub-elements and the set of high benefit sub-elements are converted to the interactive electronic technical manual database format during a first time interval and further comprising:
   identifying a second threshold benefit rating;
   identifying sub-elements in the set of unconverted sub-elements having the sub-element benefit rating that equals or exceeds the second threshold benefit rating to form a second set of sub-elements; and
   converting the second set of sub-elements from the non-interactive native file format to the interactive electronic technical manual database format and remove a sub-set of links to a sub-set of sub-elements associated with the second set of sub-elements from the hybrid interactive electronic technical manual during a second time interval to form an updated hybrid interactive technical manual.

3. The method of claim 2 further comprising:
   receiving updated maintenance history information from the plurality of operators to form updated maintenance history data; and
   performing the cost-benefit analysis on the each sub-element in the set of unconverted sub-elements using the updated maintenance history data for the device to identify sub-elements in the set of unconverted sub-elements having the sub-element rating greater than or equal to the second threshold benefit rating to form the second set of sub-elements.

4. The method of claim 1 wherein the cost-benefit analysis further comprises:
   analyzing the each sub-element in the set of remaining sub-elements based on a set of task considerations.

5. The method of claim 4 wherein a task consideration in the set of task considerations is selected from the group consisting of fault isolation task, safety task, task complexity, error prone task, component cost, time required, maintainer currency required, schematics available, training task, frequency of maintenance action, configured filter, and reliability and maintainability considerations.

6. The method of claim 1 wherein the technical data comprises at least one of circuit diagrams, animated circuit diagrams, schematics, animated schematics, part information, data on maintenance and part replacement, wiring diagrams, structure diagrams, and wiring connector repair data.

7. The method of claim 1 wherein the cost-benefit analysis further comprises:

identifying a number of fault occurrences for each task associated with each sub-element in the set of remaining sub-elements; and identifying the sub-element rating for each sub-element in the set of remaining sub-elements based on the number of fault occurrences.

8. The method of claim 1 wherein the device is an aircraft.

9. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to identify a plurality of sub-elements in technical data for a device, wherein a sub-element comprises a portion of technical data associated with a maintenance task for the device, wherein the technical data is associated with a non-interactive native file format; select a set of sub-elements associated with core maintenance tasks from the plurality of sub-elements to form a set of core sub-elements, wherein a core sub-element comprises a portion of technical data associated with a basic functionality or basic infrastructure for a hybrid interactive electronic technical manual, and the core maintenance tasks including at least one of part removal procedures, part installation procedures, and device test procedures; identify sub-elements remaining in the plurality of sub-elements to form a set of remaining sub-elements; retrieve maintenance history information for the device from a plurality of operators to form the maintenance history data; perform a cost-benefit analysis on each sub-element in the set of remaining sub-elements using maintenance history data for the device to identify a sub-element benefit rating for the each sub-element in the set of remaining sub-elements, wherein the benefit rating includes at least one of a number of maintenance procedures performed for the sub-element and a number of fault codes generated for the sub-element in the set of remaining sub-elements; select sub-elements in the set of remaining sub-elements having a sub-element rating greater than or equal to a threshold benefit rating to form a set of high benefit sub-elements, wherein sub-elements in the set of remaining sub-elements having a sub-element rating below the threshold benefit rating form a set of unconverted sub-elements; and convert the set of core sub-elements and the set of high benefit sub-elements from the non-interactive native file format to an interactive electronic technical manual database format and generating a set of links to the set of unconverted sub-elements to form the hybrid interactive electronic technical manual, wherein each link in the set of links is a link to the subset of unconverted sub-elements in the technical data in the non-interactive native file format.

10. A computer program product for developing a hybrid interactive electronic technical manual, the computer program product comprising:
a non-transitory computer usable medium having computer usable program code embodied therewith, the computer usable program code comprising:
computer usable program code configured to identify a plurality of sub-elements in technical data for a device, wherein a sub-element comprises a portion of technical data associated with a maintenance task for the device, wherein the technical data is associated with a non-interactive native file format;
computer usable program code configured to select a set of sub-elements associated with core maintenance tasks from the plurality of sub-elements to form a set of core sub-elements, wherein a core sub-element comprises a portion of technical data associated with a basic functionality or basic infrastructure for a hybrid interactive electronic technical manual, and the core maintenance tasks including at least one of part removal procedures, part installation procedures, and device test procedures;
computer usable program code configured to retrieve maintenance history information for the device from a plurality of operators to form the maintenance history data;
computer usable program code configured to identify sub-elements remaining in the plurality of sub-elements to form a set of remaining sub-elements;
computer usable program code configured to perform a cost-benefit analysis on each sub-element in the set of remaining sub-elements using maintenance history data for the device to identify a sub-element benefit rating for the each sub-element in the set of remaining sub-elements, wherein the benefit rating includes at least one of a number of maintenance procedures performed for the sub-element and a number of fault codes generated for the sub-element in the set of remaining sub-elements;
computer usable program code configured to select sub-elements in the set of remaining sub-elements having a sub-element rating greater than or equal to a threshold benefit rating to form a set of high benefit sub-elements, wherein sub-elements in the set of remaining sub-elements having a sub-element rating below the threshold benefit rating form a set of unconverted sub-elements; and
computer usable program code configured to convert the set of core sub-elements and the set of high benefit sub-elements from the non-interactive native file format to an interactive electronic technical manual database format and generating a set of links to the set of unconverted sub-elements to form the hybrid interactive electronic technical manual, wherein each link in the set of links is a link to a subset of unconverted sub-elements in the technical data in the non-interactive native file format.

11. The computer program product of claim 10 wherein the set of core sub-elements and the set of high benefit sub-elements are converted to the interactive electronic technical manual database format during a first time interval and further comprising:
computer usable program code configured to identify a second threshold benefit rating;
computer usable program code configured to identify sub-elements in the set of unconverted sub-elements having the sub-element benefit rating that equals or exceeds the second threshold benefit rating to form moderate benefit sub-elements; and
computer usable program code configured to convert the set of moderate benefit sub-elements from the non-interactive native file format to the interactive electronic technical manual database format and remove a sub-set of links to a sub-set of sub-elements associated with the set of moderate benefit sub-elements from the hybrid interactive electronic technical manual during a second time interval to form an updated hybrid interactive technical manual.

12. The computer program product of claim 11 further comprising:

computer usable program code configured to receive updated maintenance history information from the plurality of operators to form updated maintenance history data and perform the cost-benefit analysis on the each sub-element in the set of unconverted sub-elements using the updated maintenance history data for the device to identify sub-elements in the set of unconverted sub-elements having the sub-element rating greater than or equal to the second threshold benefit rating to form the set of moderate benefit sub-elements.

13. The computer program product of claim 10 wherein the cost-benefit analysis further comprises:

computer usable program code configured to analyze the each sub-element in the set of remaining sub-elements based on a set of task considerations, wherein a task consideration in the set of task considerations is selected from the group consisting of fault isolation task, safety task, task complexity, error prone task, component cost, time required, maintainer currency required, schematics available, training task, frequency of maintenance action, configured filter, and reliability and maintainability considerations.

14. The computer program product of claim 13 wherein the technical data comprises at least one of circuit diagrams, animated circuit diagrams, schematics, animated schematics, part information, data on maintenance and part replacement, wiring diagrams, structure diagrams, and wiring connector repair data.

15. The computer program product of claim 10 wherein the cost-benefit analysis further comprises:

computer usable program code configured to identify a number of fault occurrences for each task associated with the each sub-element in the set of remaining sub-elements; and computer usable program code configured to identify the sub-element rating for the each sub-element in the set of remaining sub-elements based on the number of fault occurrences.

* * * * *